United States Patent [19]

Aoki et al.

[11] Patent Number: 5,000,269

[45] Date of Patent: Mar. 19, 1991

[54] DEVICE FOR ATTACHING WORKING MACHINE TO VEHICLE

[75] Inventors: Tuyoshi Aoki; Toshio Ishiguro, both of Osaka, Japan

[73] Assignee: Kubota Ltd., Osaka, Japan

[21] Appl. No.: 353,466

[22] Filed: May 18, 1989

[30] Foreign Application Priority Data

| May 23, 1988 | [JP] | Japan | 63-126854 |
| Jun. 11, 1988 | [JP] | Japan | 63-77687[U] |
| Sep. 21, 1988 | [JP] | Japan | 63-237672 |

[51] Int. Cl.$^5$ .................... A01B 59/00; E02F 9/00
[52] U.S. Cl. .................... 172/248; 172/443; 172/272; 414/686; 414/703; 37/231; 37/DIG. 3
[58] Field of Search .......... 172/272, 274, 248, 439, 172/275, 47, 443, 448, 449; 37/231, 117.5, DIG. 3; 414/686, 703

[56] References Cited

U.S. PATENT DOCUMENTS

| 2,711,679 | 6/1955 | Kuhary et al. | 172/272 |
| 3,031,208 | 4/1962 | Abbott | 172/439 |
| 3,904,051 | 9/1975 | Tsuchiya et al. | 172/7 |
| 3,961,812 | 6/1976 | Van Alworden | 172/275 |
| 3,966,065 | 6/1976 | Jones | 172/439 X |
| 4,043,470 | 8/1977 | Pilch | 414/686 |
| 4,056,250 | 11/1977 | Uchiyama | 172/272 X |
| 4,087,009 | 5/1978 | Profenna et al. | 172/272 X |
| 4,470,751 | 9/1984 | Masuzawa et al. | 172/274 X |
| 4,512,413 | 4/1985 | Hirata et al. | 172/74 |
| 4,558,881 | 12/1985 | Manteufel | 172/448 X |
| 4,661,036 | 4/1987 | Horsch | 172/272 X |

FOREIGN PATENT DOCUMENTS

| 2295907 | 7/1976 | France | 414/586 |
| 63-161958 | 10/1988 | Japan . | |

Primary Examiner—Randolph A. Reese
Assistant Examiner—Jeffrey L. Thompson

[57] ABSTRACT

A device for attaching a working machine to a vehicle in which a heavy weight working machine can be detachably and fixedly attached to the vehicle and a three point link type working machine can also be attached through a three points linking mechanism when the heavy working machine is not attached to the vehicle. The device includes an attachment frame at a rear portion of the vehicle body, and a working machine connecting portion for attaching the heavy weight working machine. Further, a three point link connecting portion for connecting the three point linking mechanism is provided on the attachment frame.

34 Claims, 7 Drawing Sheets

DEVICE FOR ATTACHING WORKING MACHINE TO VEHICLE

BACKGROUND OF THE INVENTION

The present invention relates to a device for selectively attaching a working machine such as a rotary cultivator and a backhoe to a vehicle body.

In a vehicle having wheels and an engine such as a tractor, there are provided at its rear end portion a three point linking mechanism and a hydraulic device for operating the linking mechanism. As disclosed in U.S. Pat. Nos. 4,512,413 and 3,904,051, known are a rotary cultivator or a backhoe attached to a rear portion of the three point linking mechanism.

The three point linking mechanism is available for vertically movably mounting agricultural equipment such as the rotary cultivator. The mechanism is primarily used for mounting a working machine having a light weight, and the mechanism is not frequently used for mounting a heavy working machine such as the backhoe, since it would be difficult to provide high strength in the linking mechanism in order to attach the heavy device.

Therefore, the backhoe is not attached by means of the three point linking mechanism but is attached directly to the vehicle body through an attaching portion of the backhoe as disclosed in Japanese Utility Model Application Kokai No.63-161958.

In case of the direct attachment of the backhoe to the vehicle body, a special vehicle body which is exclusively used for the attachment of the backhoe must be provided for detachably mounting the backhoe to such vehicle body. The special vehicle body is not provided with a connecting portion of the three point linking mechanism, and therefore, the vehicle body does not permit other types of agricultural equipment to be attached thereto. Accordingly, such a vehicle body is not available for wide applicability.

SUMMARY OF THE INVENTION

The present invention has been provided in order to overcome the above described drawback attendant to the conventional arrangement.

It is an important object of this invention to provide a device for attaching a working machine to a vehicle in which a heavy weight working machine can be detachably and fixedly attached to the vehicle and a three point link working machine can also be attached through a three point linking mechanism when the heavy working machine is not attached to the vehicle. Such advantages are attained by providing an attachment frame at a rear portion of the vehicle body, and a working machine connecting portion for attaching the heavy weight working machine and a three point link connecting portion for connecting the three point linking mechanism juxtaposedly provided at the attachment frame.

Another important object of the present invention is to provide a device in which there is provided an upper and lower connecting portion mounted on the attachment frame for connecting the rear working machine a top link connecting portion and a lower link connecting portion for connecting the three point linking mechanism, and in which the top link connecting portion and the lower link connection portion do not become obstacles when connecting the rear working machine to the upper and lower connecting portion, and the the upper and lower connecting portion does not become an obstacle when connecting the three point linking mechanism to the top link connecting portion and the lower link connecting portion.

Still another important object of the invention is to provide the device for attaching the working machine to the vehicle in which a reinforcing frame is mounted on the vehicle for supporting a front working machine to a front portion, and a rear portion of the reinforcing frame and the attachment frame are connected together for a mutual reinforcement.

Still another important object of the invention is to provide such device in which the connecting portion of the attachment frame and the portion to be connected provided on a mounting frame of the rear working machine are removably locked to each other by locking means, and the rear working machine can be secured without looseness.

Still another object of the invention is to provide a device in which a wedge member is used as the locking means which provides locking connection between the connecting portion and a portion to be connected, and the wedge member can be biased by a spring toward an insertion direction, so that a fixed connection without looseness is attainable.

Still another object of the invention is to provide a device in which locking and releasing operations can be facilitated by insertion of the wedge member of the locking means and by holding the same at a retracted position.

These and other objects of the present invention will be attained by providing a device for attaching a working machine to a vehicle comprising: a vehicle body having wheels and an engine; an operator's seat and a manipulation handle disposed on the vehicle body; a hydraulic device mounted on a rear upper portion of the vehicle body for vertically moving a three point link type working machine; a rear attachment frame fixedly secured to the rear portion of the vehicle body, a rear working machine disposed at a rear side of the vehicle and selectively arranged relative to a three point link type working machine: the attachment frame being provided with a top link connecting portion adapted to be connected to a top link for connecting the working machine, a right and left lower link connecting portion adapted to be connected to a right and left lower link, an upper connecting portion adapted to be connected to an upper coupling portion provided at the front portion of the rear working machine, and a lower connecting portion adapted to be connected to a lower coupling portion; an upper locking means adapted to connect the upper coupling portion to the upper connecting portion; and a lower locking means adapted to connect the lower coupling portion to the lower connecting portion.

In another aspect, the present invention also provides a device for attaching a working machine to a vehicle comprising; a vehicle body having wheels and an engine; an operator's seat and a manipulation handle disposed on the vehicle body; a hydraulic device mounted on a rear upper portion of the vehicle body for vertically moving a three point link type working machine; a reinforcing frame fixed to the laterally lower sides of the vehicle body; a working machine attachment frame fixed to the vehicle body and to a rear portion of the reinforcing frame; a rear working machine positioned at a rear side of the vehicle, the rear working machine having a mounting frame detachably mounted on the attachment frame; a front working machine positioned in front of the vehicle body and attached to a front portion of the reinforcing frame; an attachment seat disposed on the vehicle body for mounting the operator's seat thereon in frontward and rearward directions; the attachment frame having a front upper portion provided with a top link connecting portion adapted to be connected to a top link, a front lower portion provided with a lower link connecting portion adapted to be connected to right and left lower links and rear upper and lower portions each provided with upper and lower connecting portions for connecting upper and lower coupling portions of the mounting frame, and a control box disposed on the mounting frame for controlling the rear working machine.

BRIEF DESCRIPTION OF THE DRAWINGS

In the drawings,

FIGS. 1 through 10 show a first embodiment of this invention, and in which,

FIGS. 11 through 14 show a second embodiment of this invention, and in which,

FIGS. 15 through 17 show a third embodiment of this invention, and in which,

FIG. 15.

DETAILED DESCRIPTION OF THE PREFERRED EMBODIMENTS

The present invention will be described by way of various embodiments with reference to accompanying drawings.

A first embodiment according to this invention will first be described with reference to FIGS. 1 through 10.

Figures 9, 10:
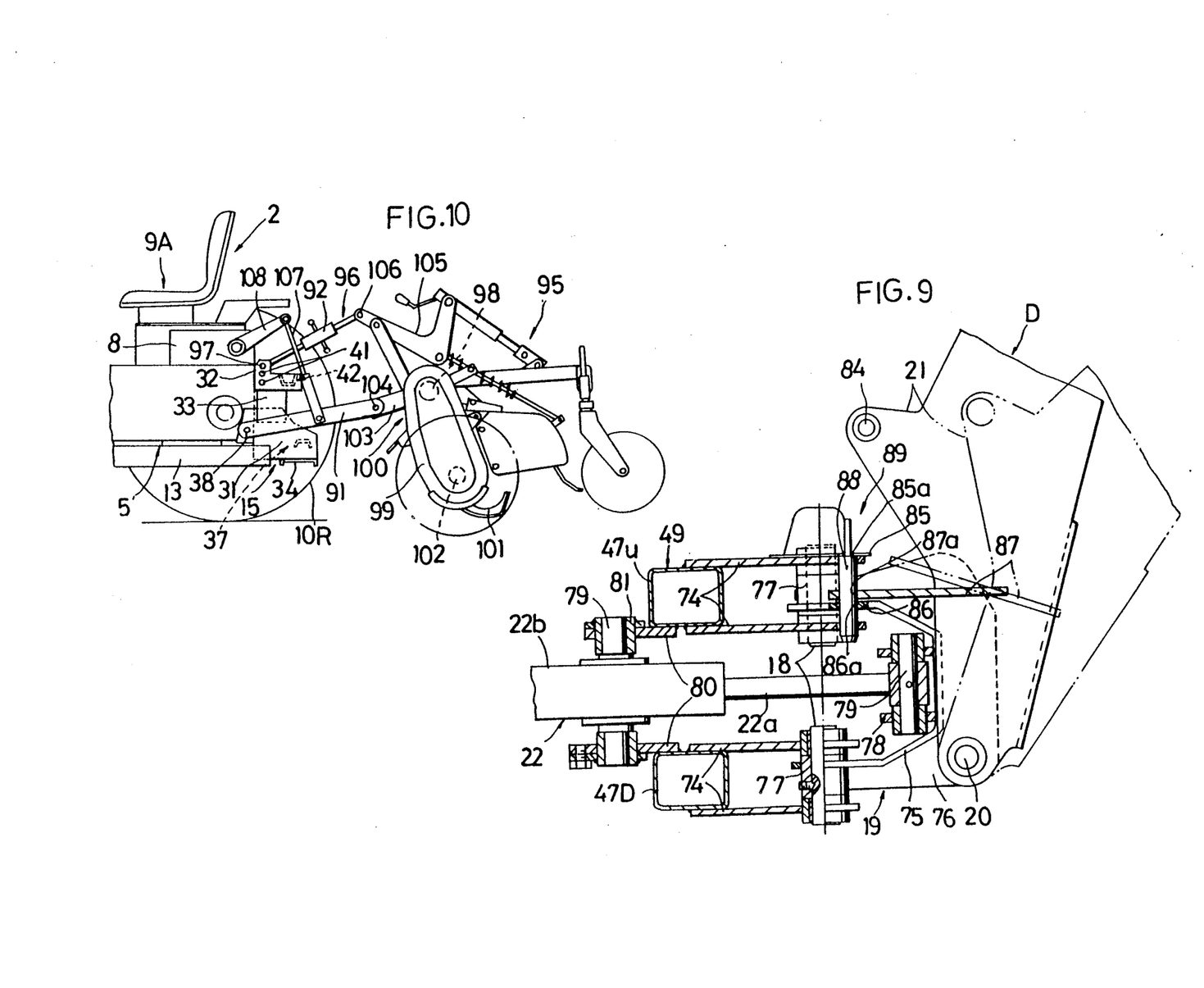
FIG. 9 is a cross-sectional side view showing a rotatable locking means.
FIG. 10 is a side view showing a state where a rotary cultivator is installed.
Figures 11, 12, 13, 14:
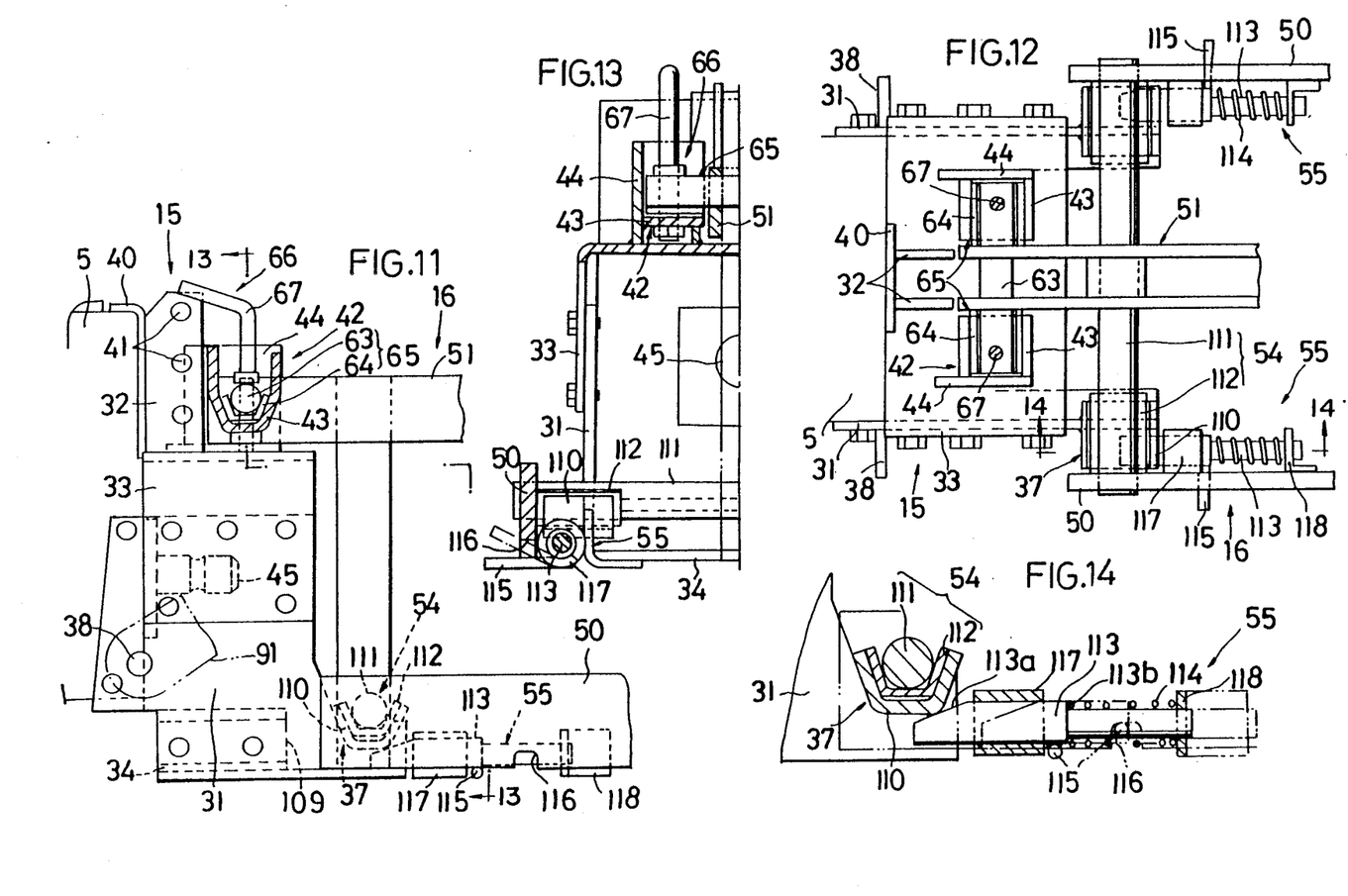
FIG. 11 is a side view partly cross-sectioned showing a an essential portion where the backhoe is installed.
FIG. 12 is a plan view of FIG. 11.
FIG. 13 is a cross-sectional view taken along a line 13—13 of FIG. 11.
FIG. 14 is a cross-sectional view taken along a line 14—14 of FIG. 12.

A tractor loader backhoe 1 includes a central tractor 2 having a front end detachably provided with a front loader 3 and a rear end detachably provided with a backhoe 4. In FIG. 10, instead of the backhoe 4 a rotary cultivator 95 is connected to the tractor 2, by detaching the backhoe 4.

Figures 3, 4, 5:
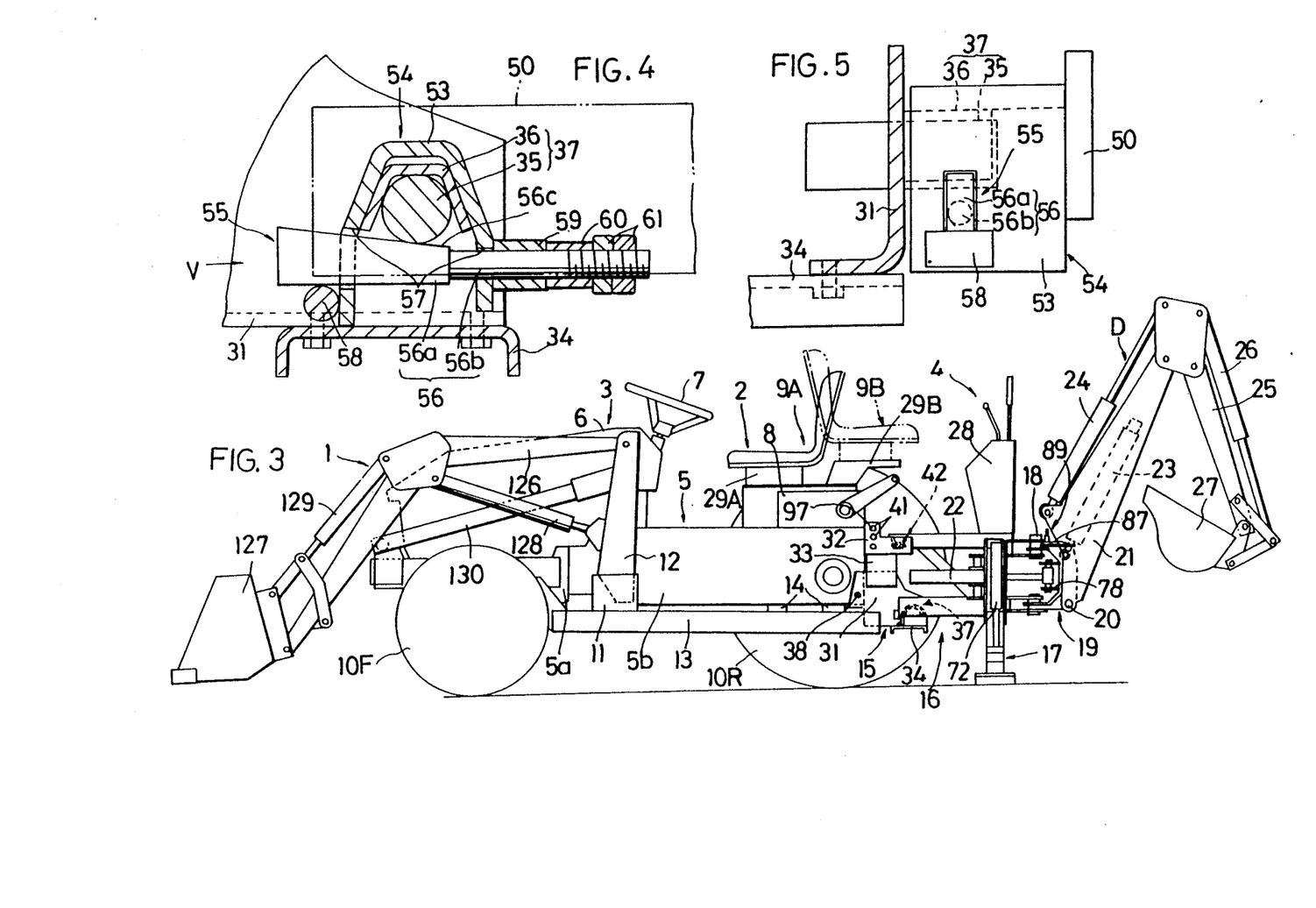
FIG. 3 is a side view showing an entire tractor loader backhoe.
FIG. 4 is a cross-sectional view taken along a line 4—4 of FIG. 2.
FIG. 5 is a view taken along arrow V in FIG. 4.

In FIG. 3, a tractor body 5 of the tractor 2 includes an engine 5a, a transmission 5b, steering front wheels 10F and rear wheels 10R driven by the engine 5a. The engine 5a is covered with a hold 6, and a steering handle 7 is disposed at the rear portion of the hood 6. A hydraulic device 8 for vertically moving a working machine is mounted at a rear upper portion of the body 5 and an operator's seat 9 is provided above the hydraulic device 8.

A front loader mounting table 11 is disposed on lateral sides at a longitudinally intermediate portion of the tractor body 5, and a post 12 of the front loader 3 is detachably provided to the mounting table.

The front loader 3 is detachably mounted at the front portion of the tractor body 5. A boom 126 has a base end portion pivotally supported to a tip end of the post 12, and has a front end pivotally supporting a bucket 127. Further, a boom cylinder 128 is disposed between the post 12 and the boom 126, a bucket cylinder 129 is disposed between the boom 216 and the bucket 127, and a brace 130 is disposed between the post 12 and the front end of the vehicle body 5.

A pair of reinforcing frames 13 are provided at lower lateral sides of the body 5. The reinforcing frames 13 are positioned in a runninq direction of the vehicle 5 and are fixed to the vehicle body 5 through a plurality of brackets 14 each extending in the running direction or a lateral member connecting the right and left reinforcing frames. The front loader mounting table 11 is also fixed to the front portion of the reinforcing frames 13, so that the reinforcing frames 13 also support the front loader 3.

Figure 1:
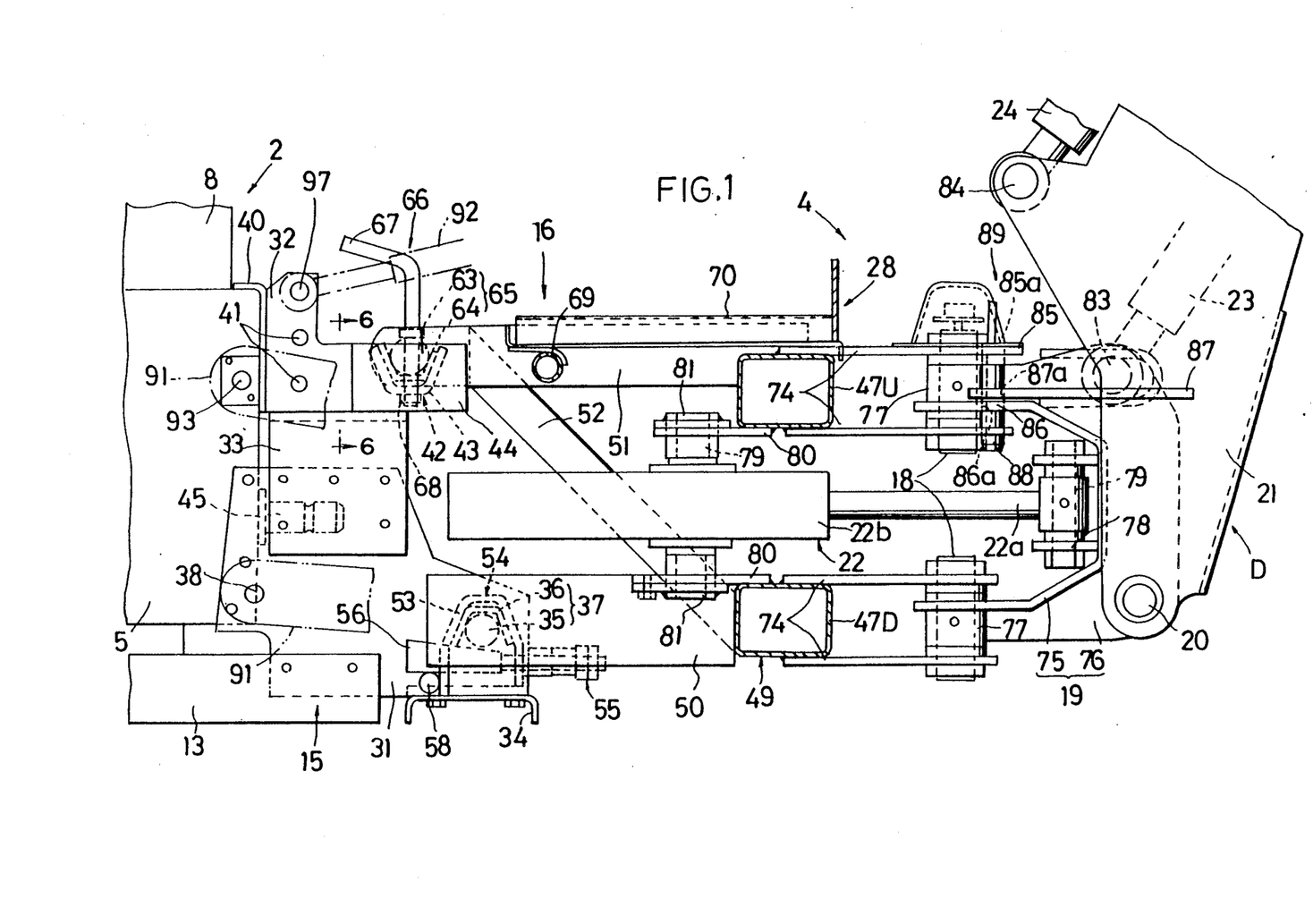
FIG. 1 is a side view showing an essential portion where a backhoe is installed.
Figure 2:
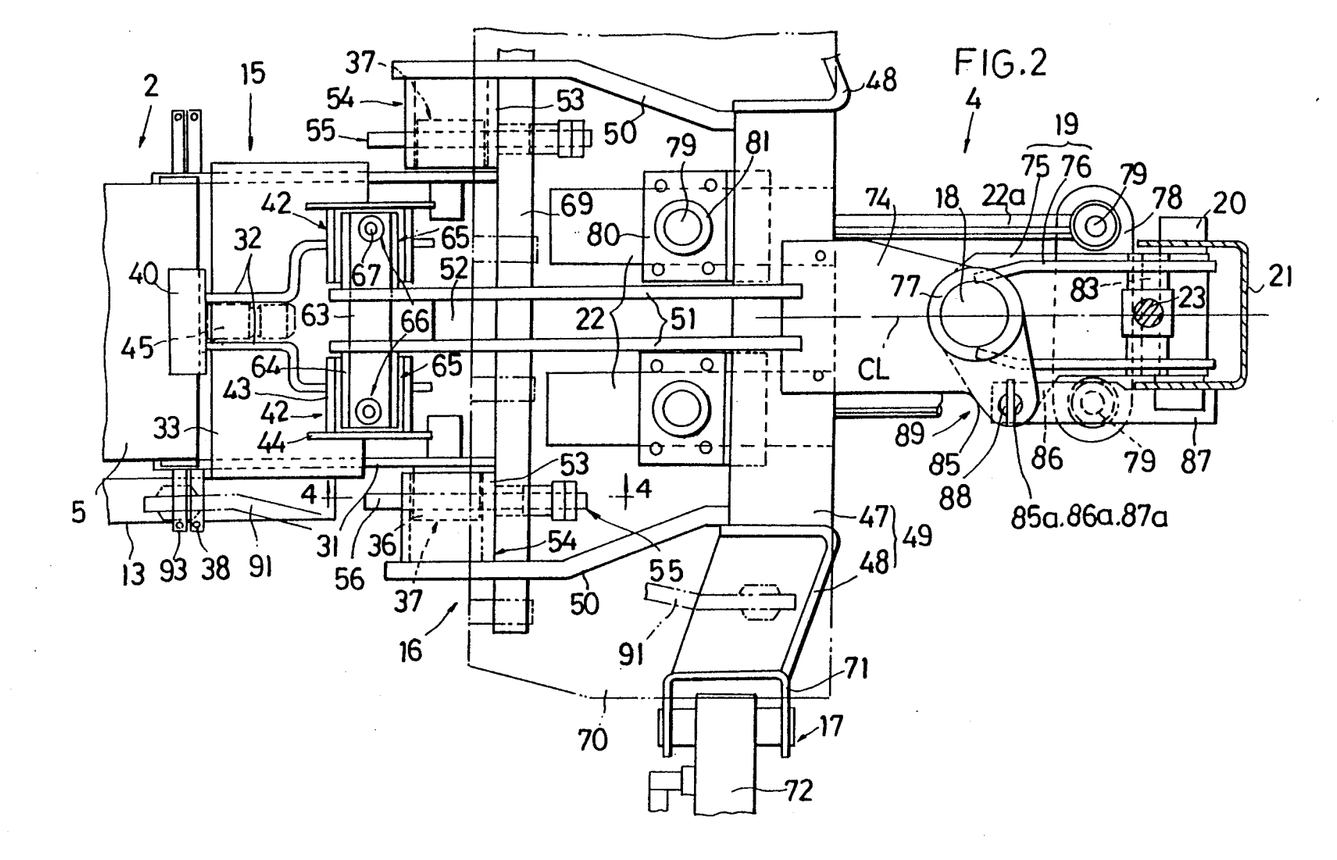
FIG. 2 is a plan view of FIG. 1.

In FIGS. 1 through 3, an attaching frame 15 is fixedly secured to the rear portion of the body 5, and a mounting frame 16 provided at the rear portion of the backhoe 4 is detachably mounted on the attaching frame 15. A pair of right and left outriggers 17 are mounted on the mounting frame 16 of the backhoe 4, and further, a swing frame 19 is swingably provided through a vertical shaft 18. A boom 21 is pivotally supported with respect to the swing frame 19 through a horizontal shaft 20. A swing cylinder 22 is disposed between the mounting frame 16 and the swing frame 19. A boom cylinder 22 is disposed between the swing frame 19 and the boom 21.

An arm 25 movable by an arm cylinder 24 is pivotally supported to a tip end of the boom 21, and a bucket 27 movable by a bucket cylinder 26 is pivotally supported to the tip end of the arm 25. Each of the cylinders 22, 23, 24, 26 are controlled by a Control box 28 mounted on the mounting frame 16.

At the rear upper portion of the vehicle body 5, are disposed attachment seats 29A, 29B for providing two seat positions. When the operator's seat 9 is attached to the attachment seat 29A and the seat 9 confronts the manipulation handle 7, tractor drive position 9A is provided. On the other hand, when the operator's seat 9 is attached to the attachment seat 29B and confronts the control box 28, the backhoe manipulation position 9B is provided.

Incidentally, in the illustrated embodiment, the single operator's seat 9 is selectively attached to one of the attachment seats. However, the single operator's seat 9 may be rotated to have two seat postures, or two operator's seats may be provided for the attachment to the attchment seats 29A, 29B.

In FIGS. 1 through 7, the attachment frame 15 has a box shaped structure in which there are provided a pair of right and left lower brackets 31, an upper bracket 32, an intermediate bracket 33 connecting between upper portions of the right and left lower brackets 31, and a linking plate 34 connecting between the lower portions of the right and left lower brakets 31.

The right and left lower brackets 31 have a front upper portion secured by a bolt to the outer side surface of the vehicle body 5 and have a front lower portion secured by a bolt to the rear end to the inner surface of the reinforcing frame 13. The brackets also have a rear lower portion bent into an L shape and secured by bolts to the linking plate 34 which links right and left brackets. At an outer side of the rear lower portion of each of the lower brackets 31, right and left lower linking portions 37 having a tapered configuration are provided by welding a mountain shaped receiving member 36 to a rod member 35. This lower bracket 31 has a front portion provided with a lower link connection pin 38 projecting laterally outwardly. The right and left lower linking portion 37 and the lower link connecting pin 38 project laterally outwardly from the vehicle body 3.

The right and left upper bracket 32 are secured by bolts to the rear upper portion of the vehicle body 5 through an attachment plate 40 welded to the front end portion. The right and left upper brackets 32 are formed with a plurality of pin holes 41 each extending in a vertical direction at the front end portion thereof for receiving the top link connecting pins, so that the top link connecting portion is provided. A distance between the rear portions of the right and left upper brackets 32 is larger than the distance between the front portions of the right and left upper brackets, so that a valley shaped (V-shaped) receiving member 43 is welded for providing a tapered right and left upper connecting portion 42. A guide plate 44 having an outwardly bulged shape is secured to the outer end of the valley shaped receiving member 43 The right and left connecting portion 43 has a width within the width of the vehicle body 5, and greater than the width of the top link connecting portion.

The intermediate bracket 33 has an arch shape at its rear surface, and lower portion of the right and left side walls are fixed to the lower bracket 31 by bolts. The intermediate bracket 33 and the right and left lower brackets 31 serve as a PTO shaft cover which cover right and left sides and upper face of a PTO shaft 45 extending from the back face of the vehicle body 5, and the upper portion is in abutment with or fixed to the right and left upper brackets 32 and the lower end of the guide plate 44. Similar to the linking plate 34, the intermediate bracket 33 links together the right and left lower brackets 31. If the bracket is welded to or fixed to the upper bracket 32 by bolts, the bracket also serves as a connecting member for reinforcing the upper bracket 32.

The mounting frame 16 which constitutes a front portion of the backhoe 4 includes a main frame body 49 having a rectangular shape provided by a pair of upper and lower angular pipe 47 and a pair of right and left angle steels positioned at both sides of the angle pipes. A right and left lower plate 50 having an increasing area in a frontward direction is protrudes from the lower angle pipe 47D, a pair of parallel right and left upper plates 51 protrude from the upper angle pipe 47U, and a stabilizer 52 is disposed between the intermediate portion of the right and left upper plates 51 and the lower angle pipe 47D.

An angle member 53 is welded to the front internal surface of the right and left lower plates 50, so that there is provided a lower coupling portion 54 adapted to be fitted with the lower connecting portion 37. The coupling and decoupling of the lower connecting portion 37 and the lower coupling portion 54 can be made by the extension of a bolt Alternatively, a wedge member 55 can be used as a lower locking means 155 as in FIGS. 11-14.

Figures 6, 7, 8:
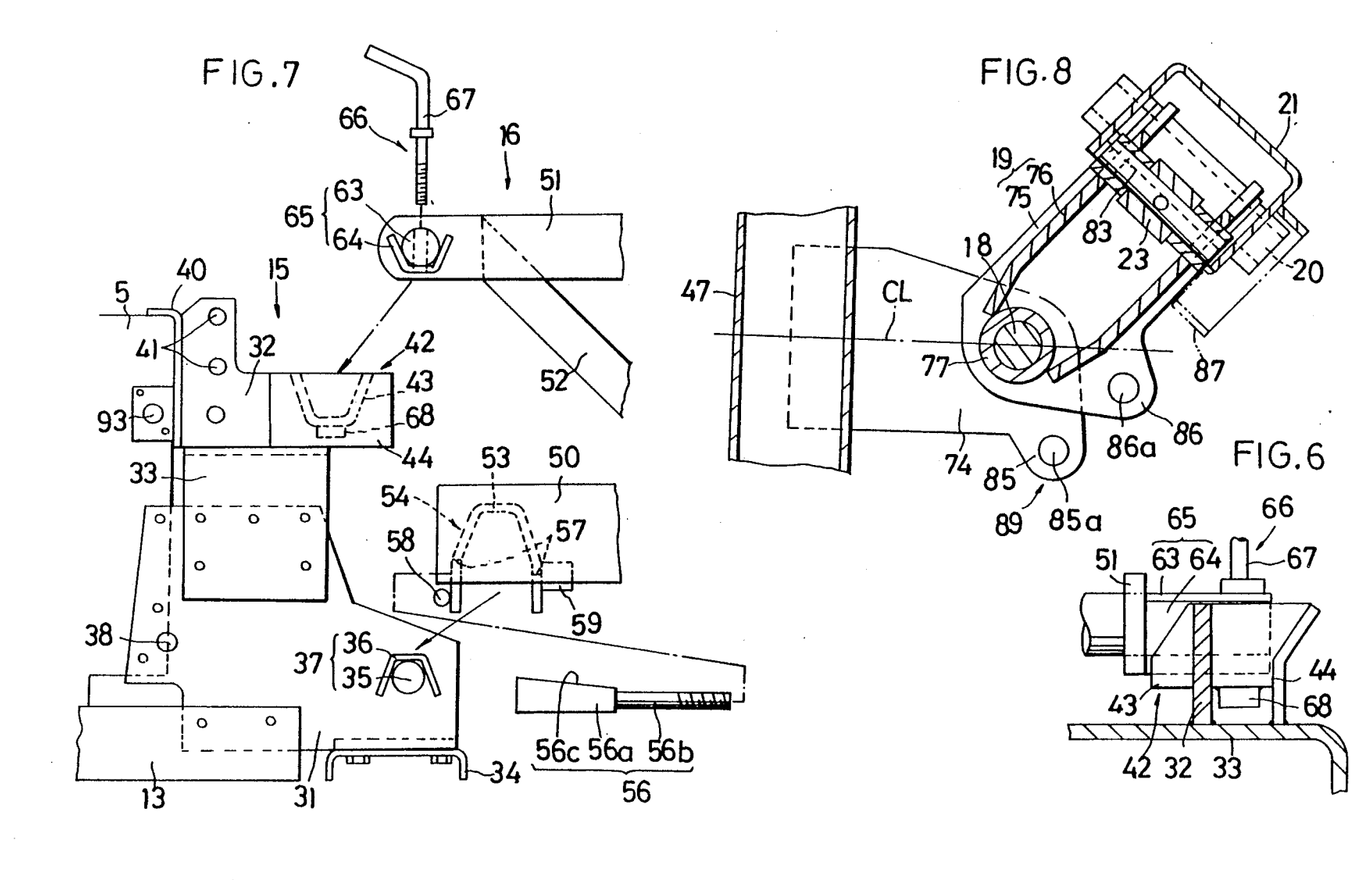
FIG. 6 is a cross-sectional view taken along a line 6—6 of FIG. 1.
FIG. 7 is an exploded side view showing attachment and detachment between an attachment frame and a mounting frame.
FIG. 8 is a cross-sectional plan view showing a swinging state of a swing frame of a backhoe.

That is, as shown in FIGS. 4, 5 and 7, the angle member 53 is formed with an insertion hole 57 for receiving the wedge member 55, and has a front face welded to a wedge member abutting rod 58, and has a rear face welded to a wedge guide member guide sleeve 59. On the other hand, the wedge member 56 is provided with a forward wedge portion 56a having a slanting engaging portion 56c and a thread portion 56b. When the wedge guide member 56 is inserted into the insertion hole 57, the forward wedge portion 56a first abuts a wedge abutting rod 58 and the rod member 35 or the lower connecting portion 37, so that the thread portion 56b projects out of the wedge guide sleeve 59. The projecting portion of the thread portion 56b is fitted with a collar 60 and is engaged with a nut 61. By the threading engagement of the nut 61, the slanting engaging portion 56c of the forward wedge portion 56a is depressed against the rod member 35. Therefore, the lower conecting portion 37 and the lower coupling portion 54 are fixedly locked with each other without any looseness.

As shown in FIGS. 1, 2, 6 and 7, the front portion of the right and left upper plates 51 allow a single roundish rod 63 to pass therethrough, and the rod 63 is fixed to the plates. At end portions and at the lower sides of the rod 63, a valley shaped mount member 64 is fixed, so that the upper coupling portion 65 to be coupled to the upper connecting poriton 42 is provided. The upper connecting portion 42 and the upper coupling portion 65 are locked with each other by an upper locking means 66 which is provided with a bolt 67 extending through the roundish rod 63 and the valley shaped mount plate 64 and a nut 68 disposed at the valley shaped receiving member 64 for threading enagement with the bolt 67.

The lower connecting portion 37 and the lower coupling portion 54 and the upper connecting portion 42 and the upper coupling portion 65 are provided with tapered faces for taper-fitting engagement with each other. Therefore, the tapered faces guide travel in the forward and rearward direction during fitting. Therefore, a relative position between the tractor 2 and the backhoe 4 in frontward and rearward direction can be corrected.

A pipe member 69 is disposed at an intermediate portion of between the right and left upper plate 51 in frontward and backward direction. A step plate 70 is secured by the pipe member 69 and the upper angle pipe 47U. The control box 28 is disposed at the rear upper portion of the step plate 70

An outrigger supporting member 71 is disposed at an outer edge portion of the right and left angle steels 48, and a base portion of a cylinder for the outrigger 17 is pivotably supported to the upper portion of the supporting member 71.

The attachment frame 15 at the side of the vehicle body 5 and the mounting frame 16 at the side of the backhoe 4 are separated from each other in such a manner that the outrigger 17 of the backhoe 4 and the bucket 27 are in contact with ground, and the backhoe 4 is self-standable. By the retraction of the outrigger cylinder 72, the upper and lower coupling portions 65, 54 are moved toward their descent positions and engaged with the upper and lower connecting portions 42,37, and are fixedly mounted by the upper and lower locking means 66,55. Reversely, after releasing the upper and lower locking means 66,55, the cylinder 72 is extended, so that the upper and lower coupling portions 65,54 are disengaged from the upper and lower connecting portions 42,37, so that the tractor 2 and the backhoe 4 are separated from each other.

When the backhoe 4 is disassembled from the tractor 2 the three point linking mechanism 96 can be coupled to the tractor 2 for mounting thereon a rotary cultivator 95, a box blade, or other three point link working machine. FIG. 10 shows a state in which the rotary cultivator 95 is linked to the tractor.

Although not described in detail with respect to the rotary cultivator 95, the rotary cultivator 95 includes a frame body 100 in which a transmission case 99 and a side frame are fixedly secured. The transmission case 99 is provided at outer ends of support arms 98 projecting laterally from a central gear case. The cultivator also includes a pawl shaft 102 provided with pawls 101, which pawl shaft extends in a horizontal direction and is rotatably provided about its axis at a position below and between the transmission case 99 and the side frame. A lower link coupling portion 104 adapted to be connected to the rear end of the lower link 91 is provided at the pair of right and left brackets 103 extending frontward from the upper portion of the frame body 100. Further a top link coupling portion 106 adapted to be connected to the rear end of the top link 92 is provided at a support mast 105 projecting upwardly and frontwardly. After the backhoe 4 is disassembled from the tractor 2 at the front portion of the three point linking mechanism 96, the lower link 91 is connected to the lower link connection pin 38 of the lower bracket 31, and the top link 92 is connected to the connecting pin 97 extending through the top link connection pin hole 41. The intermediate portion of the lower link 91 is cooperatively connected to a lift arm 108 of the hydraulic device 8 through a lift rod 107.

Thus, the three point link working machine installed by way of the three point linking mechanism 96 can be installed while the attachment frame 15 is mounted on the vehicle body 5.

Incidentally, if the backhoe 4 is installed to the tractor 2, the three point linking mechanism 96 can be dispensed with, and therefore, the mechanism can be disassembled from the vehicle body. However, if the tractor 2 has sufficient space for accommodating the mechanism, particularly for accommodating the lower link 91, the mechanism can remain on the vehicle body. On the other hand, if no sufficient space is provided the front end of the lower link 91 is engaged with the supplemental pin 93 provided at the rear upper side of the vehicle body 5 and the rear end of the lower link is disposed within the angle steel 48 as shown by a dotted chain line in FIGS. 1 and 2. Alternatively, the rear end is latched with the angle steel 48 by a fastening member, or the intermediate portion of the lower link may be latched with two or four posts so as to provide sufficient working space.

In FIGS. 1 thru 3, 8 and 9, the mounting frame 16 has a pair of pivot plates 74 projecting rearwardly from the upper and lower angle pipes 47U 47D, and a vertical shaft 18 is rotatably supported in each one of the pivot plate 74. The swing frame 19 has a swing plate 75 having C-shape in side view and a pair of supporting plates 76 welded to the outer side of the swing plate and extending in a direction perpendicular thereto. A boss member 77 is welded at the upper and lower legs of the swing plate 75, and the boss member 77 is fittedly secured to the vertical shaft 18 between the two pivot plates 74.

A pin support member 78 is fixed to the swing plate 75. A tip end of the swing cylinder 22 is fittedly secured to a pair of right and left swing pins 79 pivotally supported to the pin support member 78.

A pair of right and left swing cylinders 22 are provided. Upper and lower trunion shaft 79 protruding from the main body 22b is provided rotatable about a vertical shaft and is supported by a fixing plate 80 frontwardly protruding from the upper and lower angle pipes 47U 47D through a pivot boss member 81. The right and left swing cylinder 22 is adapted to pivot the swing frame 19 rightwardly and leftwardly by an angle of 70 to 80 degrees with respect to a center line CL to the backhoe 4. Therefore, the swing frame 19 can be pivotally moved by an angle ranging from 140 to 160 degrees.

The pair of right and left support plates 76 of the swing frame 19 have a lower portion for securing the horizontal shaft 20, and have an upper portion pivotally supporting a boom pin 83. The horizontal shaft 20 projects laterally from the support plate 76 so as to pivot the base end of the boom 21. A main body of the boom cylinder 23 is supported with respect to the boom pin 83. Reference numeral 84 designates a pin for attaching an arm cylinder 24 disposed at the boom 21.

The upper leg portions of the upper pivot plate 74 and the swing plate 75 are provided with projecting portions 85 86 extending laterally outwardly from the vertical shaft 18, and pin holes 85a and 85b are formed at the respective projecting portions. The pin holes 85a and 86a are aligned with each other when a center of the swing plate 75 is coincident with the center line CL of the pivot plate 74.

Further, a locking plate 87 is fixed to the side of the boom 21. The locking plate 87 has a front portion provided with pin hole 87a. When the boom 21 is moved upwardly, the pin is positioned between the projecting portions 85 and 86 of the pivot plate 74 and the swing plate 75, so that a pin hole 87a is coaxial with the pin holes 85a and 86a.

When the backhoe 4 is transported or accommodated within an accommodation posture D the center of the swing plate 75 and the boom 21 are in alignment with the center line CL of the mounting frame 16 and the pivot plate 74, so that the boom 21 has an approximately uppermost position with respect to the swing plate 75. In order to maintain this state or in order to maintain a position extremely close to this position, the pin holes 85a, 86a, 87a are formed, and the locking pin 88 is inserted into the pin holes oriented coaxial with each other. As a result, the boom 21 is maintained at a non swingable and non-vertically movable phase. The pin holes 85a, 86a, 87a and the locking pin 88 constitute in combination the locking means 89 for the backhoe 4 for avoiding its swinging motion.

Incidentally, the locking plate 87 can be provided to the boom 21 in such a manner that the locking plate is positioned above the pivot plate 74 and extends in parallel therewith when the boom 21 is at its accommodation posture. With this arrangement, the locking means 89 can be provided at an extension of the center line CL.

FIGS. 11 through 14 show a second embodiment according to this invention. Description will be given particularly on the distinguishing points relative to the first embodiment. The attachment frame 15 includes right and left lower brackets 31, right and left upper brackets 32, an intermediate bracket 33, a linking plate 34, and right and left guide plates 44. The linking plate 34 provides a bottom wall of a hitch box 109 bridging between the front lower portions of the right and left lower brackets 31. The right and left lower brackets 31 are not connected to the reinforcing frame. The rig t and left upper brackets 32 are spaced apart from the upper connecting portion 42 in frontward and backward directions.

The right and left upper connecting portions 42 are mounted on the intermediate bracket 33, and a receiving member 43 is only attached to the guide plate 44. The receiving plate 43 is constituted by a member having a U-shape in cross-section, and has a bottom portion provided with a valley tapered in frontward and backward directions. The right and left upper coupling portion 65 and the upper locking means 66 are identical with those used in the first embodiment.

The relationship between the right and left lower connecting portion 37 and the lower coupling portion 54 is the same as the relationship between the upper connecting portion and the upper coupling portion in the first embodiment. A valley shaped receiving member 11 is fixed at the rear portion of the right and left lower brackets 31, and a rod member 111 and the valley shaped rod member 112 of the lower coupling portion 54 is fixed to the lower pate 50 of the mounting frame 16, and further, the coupling portion 54 is mounted from the upper portion of the lower connecting portion 37 and is fixed by the lower locking means 155. Incidentally, the receiving member 110 also projects inwardly from the lower bracket 31.

The lower locking means 155 is provided at an inner side of the respective right and left lower plates 50. The lower locking means is also provided with a wedge member 113 slidable in a frontward and a backward direction and having an engaging tip face 113a a spring 114 for biasing the wedge member 113 toward the mount member 112, a handle 115 which is gripped when the wedge member 113 is retracted rearwardly against the biasing force of the spring 114, and a holding portion 116 for holding the wedge member 113 at its retracted position when the wedge member is rearwardly moved against the biasing force of the spring 114.

The wedge member 113 is supported by a guide sleeve 117 and a guide plate 118 fixed to an inner side of the lower plate 50, and the spring 114 is disposed over the wedge member 113 between a stepped portion 113b of the wedge member 113 and the guide plate 118. The handle 115 is disposed in a direction perpendicular to the wedge member 113, and the holding portion 116 is defined by a notch formed at the lower edge of the lower plate 50 for detachably engaging the handle 115.

When the handle 115 is disengaged from the holding portion 116, in the lower locking means 155, the wedge member 113 is advanced through the spring 114, so that the receiving member 110 is interposed between the wedge member and the mount member 112. With the arrangement, connection between the lower connecting portion 37 and the lower coupling portion 54 is locked. When engaging with the holding portion 116 after moving the handle 115 rearwardly, this locking is released, so that the wedge member 113 is held at its retracted position. Even if the lower locking means 155 is positioned between rear wheels 10R of the tractor 2, operation for releasing the locking can be easily achieved. During locking enagement, the locking is tightly provided since the wedge member 133 is urged in the inserting direction by the spring 114. Therefore, the backhoe 4 can be rigidly coupled to the vehicle body 5.

Figures 15, 16, 17:
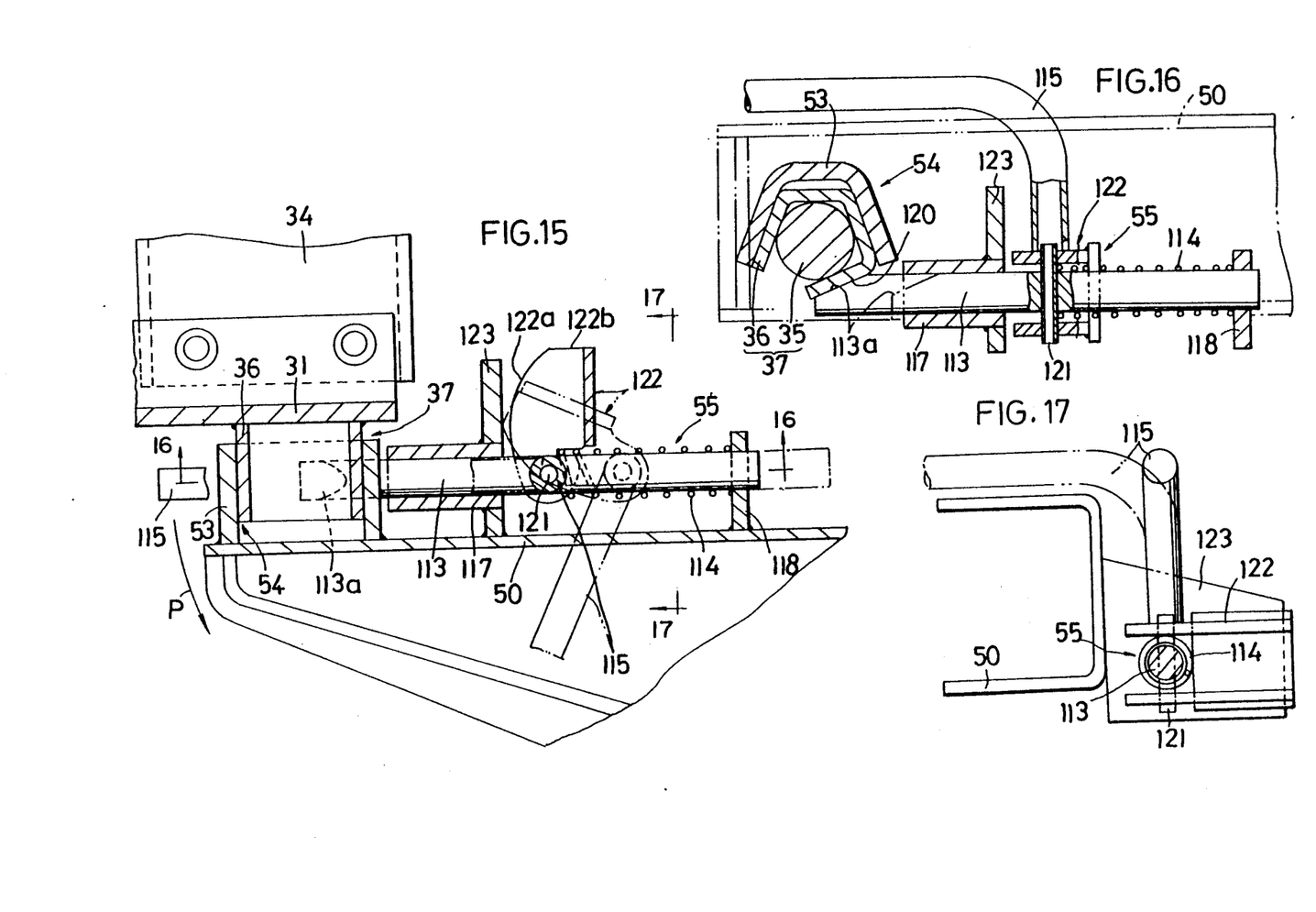
FIG. 15 is a cross-sectional plan view showing a lower connecting portion and a lower locking means when installing a backhoe.
FIG. 16 is a cross-sectional view taken along line 16—16 of FIG. 15.
FIG. 17 is a cross-sectional view taken along a line 17—17 of FIG.

FIGS. 15 through 17 show a third embodiment of this invention wherein the lower connecting portion 37 is identical with that of the first embodiment. However, angle receiving member 36 extends below the rod member 35 so as to provide a wedge receiving face 120 abuttable with a planting engaging portion 113a of the tip end of the wedge member 113.

Further, the lower locking means 155 would be the same as that of the second embodiment such that the wedge member 113 is slidably disposed in frontward and backward directions by the guide sleeve 117 and the guide plate 118, and the urging manner of the spring 114 toward the lower coupling portion 54 may be the same as the second embodiment. However, remaining construction is different from the foregoing embodiments.

That is, a pin 121 extends through the wedge member 113, and a cam member 122 is pivotally secured by the pin 121. A handle 115' is fixed to the cam member 122, and a guide sleeve 117 fixedly secures a cam receiving plate 123 with which a cam surface 122a of the cam member 122 and a holding portion 122b are abutted. The cam member 122 is constructed by coupling upper and lower cam plates pivotally supported to the pin 121 by means of a vertical plate.

The spring 114 is interposed between the pin 121 and the guide plate 118, so that the wedge member 113 is biased leftward in FIG. 16 for engaging the slanting engaging portion 113a with the wedge receiving face 120. When the cam member 122 is rotated in a counterclockwise direction P in FIG. 15 through the handle 115', the cam face 122a is brought into abutment with the cam receiving plate 123, and the wedge member 113 is retracted against the biasing force of the spring 114 for abutting the holding portion 122b, to thereby hold the wedge member 113 in its retracted position. The handle 115' is outwardly protruded from the lower plate 50 when the wedge member 113 is at its retracted position, so that a locking and lock releasing operation of the lower locking means 155 is facilitated.

According to the third embodiment, since the cam member 122 provided at the tip end of the handle 115' is adapted for locking and releasing the locking engagement, the wedge member 113 can be easily released, even if the biasing force of the spring 114 is high and the tight engagement is provided between the slanting engaging portion 113a and the wedge receiving face 120.

Incidentally, the present invention is not limitted to the foregoing embodiments, out various modifications can be made therein. For example, lower locking means 155 is used for locking between the upper connecting portion 42 and the upper coupling portion 65, and the upper locking means 66 is used for locking between the lower connecting portion 37 and the lower coupling portion 54. The attachment frame 15 can be provided by a pair of right and left plate members and a plurality of linking members connecting between the right and left plates, and the upper and lower connecting portions 42 and 37, the top link connecting pin hole 41 and the lower link connecting pin 38 can be provided at the pair of right and left plate members.

What is claimed is:

1. A device for attaching a working machine to a travelling vehicle comprising:
   a vehicle body having wheels and an engine;
   an operator's seat and a drive wheel disposed on the vehicle body;
   a hydraulic actuator mounted on a rear upper portion of the vehicle body for vertically moving a three point link type working machine;
   a rear attachment frame fixedly secured to the rear portion of the vehicle body;
   a rigidly mounted rear working machine and a three point link type working machine each selectively attached to said rear attachment frame;
   said rear attachment frame being provided with a top link connecting portion adapted to be connected to a top link for connecting said three point link type working machine thereto, right and left lower link connecting portions adapted to be connected to right and left lower links for connecting the three point link type working machine, an upper connecting portion adapted to be connected to an upper coupling portion provided at the front portion of the rigidly mounted rear working machine, and a lower connecting portion adapted to be connected to a lower coupling portion provided at the front portion of the rigidly mounted rear working machine;
   wherein the top link connecting portion and the right and left lower link connecting portions are provided at the front portion of the attachment frame, and the upper connecting portion and the lower connecting portion are provided at the rear portion of the attachment frame;
   wherein the upper connecting portion comprises a pair of right and left connecting portions, and the lower connecting portion comprises a pair of right and left connecting portions, a distance between the lower connecting portions being greater than a distance between the upper connecting portions;
   an upper locking means adapted to selectively lock the connection between the upper coupling portion and the upper connecting portion; and
   a lower locking means adapted to selectively lock the connection between the lower coupling portion and the lower connecting portion.

2. The device for attaching a working machine to a vehicle as claimed in claim 1, further including an elongated auxiliary frame provided at lateral lower sides of the vehicle body and extending in a longitudinal direction of the vehicle body, the auxiliary frame having a rear portion connected to a front lower portion of said rear attachment frame.

3. The device for attaching a working machine to a vehicle as claimed in claim 2, wherein the vehicle body has a front portion provided with a front working machine, and the auxiliary frame has a front portion provided with a mounting table for mounting right and left posts of the front working machine.

4. The device for attaching a working machine to a vehicle as claimed in claim 1, wherein said rear attachment frame comprises a pair of right and left upper brackets fixed to the upper rear portion of the vehicle body, right and left lower brackets fixed to the rear lower portion of the vehicle body, an intermediate bracket connecting the upper portions of the right and left lower brackets, and a linking plate connecting the lower portions of the right and left lower brackets.

5. The device for attaching a working machine to a vehicle as claimed in claim 4, wherein a power take-off shaft rearwardly extends from the rear portion of the vehicle body, and the right and left lower brackets and the imtermediate bracket cover right, left, and upper sides of the power take-off shaft.

6. The device for attaching a working machine to a vehicle as claimed in claim 4, wherein the right and left upper brackets have front portions formed with top link connection pin holes, and have rear portions provided with the upper connecting portion.

7. The device for attaching a working machine to a vehicle as claimed in claim 4, wherein a pair or right and left upper connecting portions are provided at positions above the intermediate bracket and rearward relative to the right and left upper brackets.

8. The device for attaching a working machine to a vehicle as claimed in claim 4, wherein the right and left lower brackets have front portions provided with a lower link connection pin and have rear portions provided with the lower connecting portion.

9. The device for attaching a working machine to a vehicle as claimed in claim 8, wherein the lower link connection pin and the lower connecting portion project laterally outwardly from the outer sides of the right and left lower brackets.

10. The device for attaching a working machine to a vehcle as claimed in claim 1, wherein said upper and lower connecting portions include a receiving member, and said upper and lower coupling portions include a mount member taper fitted with the receiving member, said upper and lower locking means including a nut fixed to the lower surface of the receiving member, and a bolt extending through the mount member and the receiving member and engageable with the nut.

11. The device for attaching a working machine to a vehicle as claimed in claim 1, wherein said upper and lower connecting portions include a receiving member, and said upper and lower coupling portions include a mount member taper fitted with the receiving member, said upper and lower locking means including a slant engaging portion in abutment with the receiving member, and a wedge member for interposing the receiving member relative to the mount member.

12. The device for attaching a working machine to a vehicle as claimed in claim 11, wherein said upper and lower locking means comprises a wedge member slidably engaged with respect to the mount member, a spring for urging the wedge member toward the mount member, and a handle for moving the wedge member to its retracted position against the biasing force of the spring.

13. The device for attaching a working machine to a vehicle as claimed in claim 12, wherein said upper and lower locking means further comprises a holding portion for preventing the handle from moving when the wedge member is at its retracted position.

14. The device for attaching a working machine to a vehicle as claimed in claim 11, wherein said upper and lower locking means comprises the wedge member reciprocally movable with respect to the mount member, a spring for urging the wedge member toward the mount member, a cam receiving plate fixed to the mount member, and a cam member pivotally supported with respect to the wedge member and abuttable on a cam receiving plate, the cam member being formed with a cam face for moving the wedge member toward its retracted position upon rotation of the cam member and abutting with the cam receiving plate, and also formed with a holding face for fixing a position of the wedge member at its retracted position.

15. A device for attaching a working machine to a vehicle comprising:
   a vehicle body having wheels and an engine;
   an operator's seat and a manipulation handle disposed on the vehicle body;
   a hydraulic actuator mounted on a rear upper portion of the vehicle body for vertically moving a three point link type working machine;
   reinforcing frame fixed to the lateral lower sides of the vehicle body;
   a working machine attachment frame fixed to the vehicle body and to a rear portion o the reinforcing frame, said attachment frame having means to selectively mount either a three point link type working machine or a rigidly mounted rear working machine;
   said rigidly mounted rear working machine having a mounting frame detachably mounted on the attachment frame;
   a front working machine positioned in front of the vehicle body and attached to a front portion of the reinforcing frame;
   an attachment seat mounted on the vehicle body for mounting the operator's seat thereon in frontward and rearward directions;
   the attachment frame having a front upper portion provided with a top link connecting portion adapted to be connected to a top link for connecting the three point link type working machine, a front lower portion provided with lower link connecting portions adapted to be connected to right and left lower links for connecting the three point link type working machine, and rear upper and lower portions each provided with upper and lower connecting portions for connecting upper and lower coupling portions of the mounting frame; and
   a control box disposed on the mounting frame for controlling the rear working machine.

16. The device for attaching a working machine to a vehicle as claimed in claim 15, wherein the rear working machine comprises a pair of outriggers mounted to the rear portion of the mounting frame through a vertical shaft, a boom pivotally supported with respect to the swing frame through a horizontal shaft, an arm pivotally supported to a tip end of the boom, and a bucket pivotally supported to a tip end of the arm.

17. The device for attaching a working machine to a vehicle as claimed in claim 15, wherein the front working machine comprises a post upstandingly supported on the front portion of the reinforcing frame, a boom pivotally supported to the post, and a bucket pivotally supported to a tip end portion of the boom.

18. The device for attaching a working machine to a vehicle as claimed in claim 15, wherein when the mounting frame of the rear working machine is disengaged from the attachment frame, a front portion of the top link is connected to the top link connecting portion, front portions of the lower links are connected t the right and left lower link connecting portions, an intermediate portion of the right and left lower links are cooperatively connected to the hydraulic actuator, and the top link coupling portion and the right and left lower link coupling portions of the three point link type working machine are connected to the rear portion of the top link and the rear portion of the right and left lower links.

19. A device for attaching a working machine to a travelling vehicle comprising:
   a vehicle body having wheels and an engine;
   an operator's seat and a drive wheel disposed on the vehicle body;
   a hydraulic actuator mounted on a rear upper portion of the vehicle body for vertically moving a three point link type working machine;
   a rear attachment frame fixedly secured outboard and to the rear portion of the vehicle body, said rear attachment frame being selectively attached to either of a rigidly mounted type working machine and a three point link type working machine;
   said rigidly mounted type working machine including a pair of upper and a pair of lower coupling members at a forward end thereof, and said three point link type working machine including a top link, a pair of lower links, and a hydraulic actuator for enabling up and down movement of said three point link type working machine;
   said rear attachment frame being provided, for rigidly mounted type couplings, with upper connectors for engagement with said pair of upper coupling members of said rigidly mounted type working machine by an upper locking device and with a pair of lower connectors for engagement with said pair of lower coupling members of said rigidly mounted working machine by a lower locking device;
   said rear attachment frame further including, for said three point link type working machine, a top link receptacle for pivotably connecting with a front end of the corresponding top link and a pair of lower link receptacles for pivotably connecting with the front ends of the corresponding pair of lower links of the three point link type working machine;
   wherein said upper connectors are fixedly positioned rearwardly of the top link receptacle and said pair of lower connectors are positioned rearwardly of the pair of lower link receptacles.

20. The device as claimed in claim 19, wherein a distance between each connector of said pair of lower connectors is greater than a distance between each connector of said pair of upper connectors.

21. The device as claimed in claim 19, wherein an opposed longitudinal auxiliary frame is provided under said travelling vehicle and extendable toward a rear end of said travelling vehicle, said auxiliary frame being connected to a front underside of the attachment frame.

22. The device as claimed in claim 21, wherein a front working machine is attached in front of said travelling vehicle and a mounting table is provided in front of said auxiliary frame for attachment to a pair of posts on the front of the working machine.

23. The device as claimed in claim 19, wherein said attachment frame device for coupling a rear working machine includes a pair of upper brackets fixedly connected to a rear end of the travelling vehicle, a pair of lower brackets fixedly connected to the rear end of the travelling vehicle, a pair of intermediate brackets connecting upper ends of said pair of lower brackets, and an interconnecting plate integrally connecting lower ends of said pair of lower brackets.

24. The device as claimed in claim 23, wherein a power take-off shaft extends rearwardly from the rear end of the travelling vehicle and said pairs of intermediate and lower brackets form a gate for covering a top and sides of said power take-off shaft when viewed from the rear end of the travelling vehicle.

25. The device as claimed in claim 23, wherein the top link receptacle includes a pair of pin holes positioned forwardly on said pair of upper brackets and said pair of connector members are positioned rearwardly on said pair of upper brackets.

26. The device as claimed in claim 23, wherein said pair of upper connectors are disposed rearwardly of said pair of upper brackets and above said pair of intermediate brackets.

27. The device as claimed in claim 23, wherein said pair of lower link receptacles include pins and is positioned in front of said pair of lower brackets and said pair of lower connectors are positioned to the rear of said pair of lower brackets.

28. The device as claimed in claim 23, wherein said pair of lower link receptacles and said pair of lower connectors extend outwardly from an outer side of said pair of lower brackets.

29. The device as claimed in claim 19, wherein said pair of lower connectors each include a tapered receiving member and said pair of lower coupling members each include a tapered fitting member, and wherein said lower locking device includes a wedging member slidable on said receiving member and is movable, upon sliding toward the taper engagement, for sliding a wedge face thereof into a locking engagement therewith.

30. The device as claimed in claim 29, wherein said lower locking device includes a wedging member slidable relative to the taper engagement, a spring for urging the wedging member toward the taper engagement, a cam receiving bracket fixed relative to the taper engagement, a cam member pivotable on said wedging member and abuttted to said cam receiving bracket, and a handle secured to said cam member, wherein said cam member is provided with a cam face which pivots upon abuttment with said cam receiving bracket for retracting said wedging member, and a holding face provided on said cam for holding said wedging member in its retracted position, and wherein said cam member is formed by a combination of two vertical cam plates located over and under the wedging member, respectively.

31. A device for coupling a working machine to a vehicle comprising:
a vehicle body having wheels and an engine;
an operator's seat and drive wheel mounted on the vehicle body;
a hydraulic actuator mounted to an upper rear portion of the vehicle body for vertically moving a three point link type working machine;
a pair of lower links provided on said working machine for aiding in the vertical movement thereof;
a reinforcing frame secured to opposed lower sides of the vehicle body;
a working machine attachment frame secured to a rear portion of the vehicle body and said reinforcing frame;
a rigidly mounted type rear working machine including a mounting frame removably coupled with said attachment frame at the rear of the vehicle body;
a front working machine mounted to a front end of said reinforcing frame; and
a mount for the operator's seat for selectively positioning the seat to face to the forward end or to the rear end of the vehicle;
wherein said attachment frame is, at its rear upper portion, provided for rigidly mounted type couplings, with upper connectors for securing corresponding upper couplings of the rigidly mounted type rear working machine, and said attachment frame is further, at its rear lower portion, provided with lower connectors for securing corresponding lower couplings of said rear working machine thereto;
wherein said attachment frame is provided at front upper and lower portions thereof, for three point link type couplings, with a top link receptacle for connection with a corresponding top link and a pair of lower link receptacles for connection with a pair of corresponding lower links of a three point link type working machine; and
a control box for operating the rear working machine mounted on the mounting frame.

32. The device as claimed in claim 31, wherein the rear working machine comprises outriggers positioned at lateral sides of the mounting frame, a swing frame mounted to the rear portion of the mounting frame through a vertical shaft, a boom pivotally supported with respect to the swing frame through a horizontal shaft, an arm pivotally supported to a tip end of the boom, and a bracket pivotally supported at a tip end of the arm.

33. The device as claimed in claim 31, wherein the front working machine comprises a post upstandingly supported on a front portion of the reinforcing frame, a boom pivotally supported to the post, and a bracket pivotally supported to a tip end portion of the boom.

34. The device as claimed in claim 31, wherein upon disengagement of the mounting frame of the rear working machine from the attachment frame, a front portion of the top link is connected to the top link connecting portion, a front portion of the lower link is connected to right and left lower link connecting portions, an intermediate portion of the right and left lower links are cooperatively connected to the hydraulic actuator, and a top link coupling portion and the right and left lower link coupling portions of the three point link type working machine are connected to the rear portion of the top link and the rear portion of both the right and left lower links.

* * * * *